A. K. LEE.
Rosin Boxes and Coolers.

No. 138,809.  Patented May 13, 1873.

Witnesses:
Edwin James
K. V. Gordon

Inventor:
Archibald K. Lee.
per J. E. T. Holmead.
Attorney.

UNITED STATES PATENT OFFICE.

ARCHIBALD K. LEE, OF GALVESTON, TEXAS.

IMPROVEMENT IN RESIN BOXES AND COOLERS.

Specification forming part of Letters Patent No. 138,809, dated May 13, 1873; application filed May 3, 1873.

*To all whom it may concern:*

Be it known that I, ARCHIBALD K. LEE, of the city and county of Galveston and State of Texas, have invented an Improved Resin-Box, of which the following is a full, clear, and exact description, reference being had to the accompanying drawing and the letters of reference marked thereon making part of this specification, in which—

Figure 1:
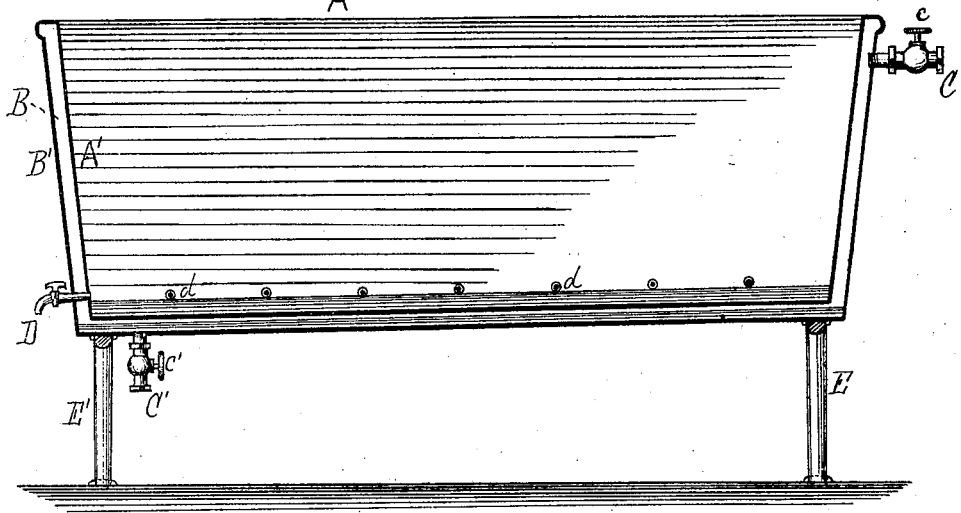
Figure 2:
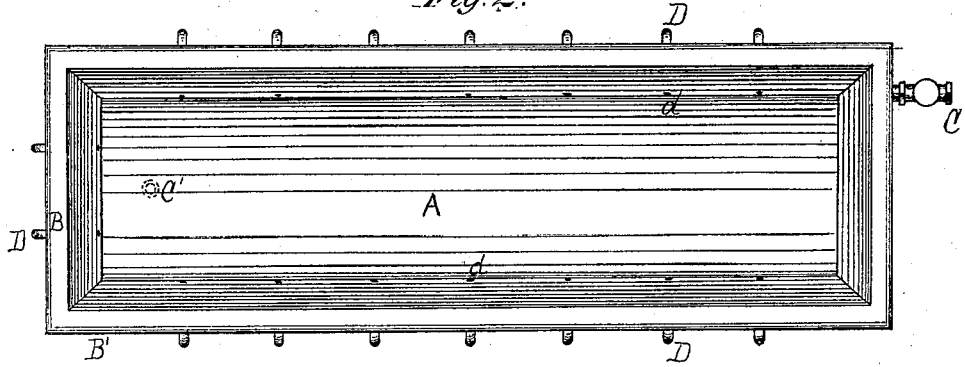
Figure 3:
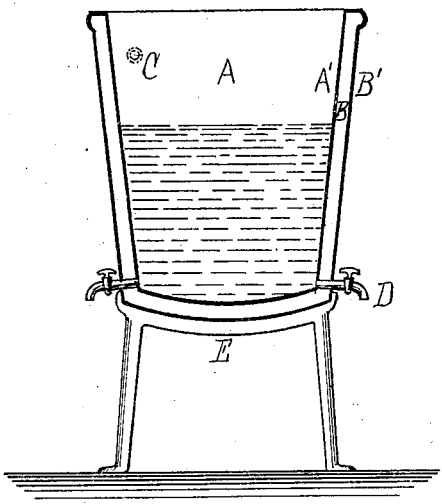

Figure 1 is a longitudinal sectional view. Fig. 2 is top-plan view. Fig. 3 is a vertical sectional view.

The object of my invention is to provide an improved box or receptacle for resin, oils, molasses, sirups, and all saccharine or other thick and heavy liquids, and which is so constructed and arranged as to permit of the liquid being surrounded by either steam or water, and which also permits, as in the case of resin, the desired degree of temperature being maintained to insure of the material being kept at such a state of liquidization as will permit of its being readily drawn off into barrels, while on the other hand, when the box is used in connection with such liquids as molasses, and which it is desirable should cool rapidly, the means provided whereby the vessel can be kept constantly surrounded with fresh cold water is of the greatest advantage.

Another most important object which my invention has in view, and which it successfully accomplishes, is that it permits of the entire surface of the box or vessel being surrounded by barrels, and which can all be filled at one and the same time, and which is certainly a great improvement on the present method of dipping out the resin and other liquids, not only greatly facilitating, and with an immense saving of labor, the process of barreling, but at the same time possessing this great advantage, that so soon as the liquid has been sufficiently cooled to barrel, the box can be almost immediately emptied and again filled, and which saving of time is of the greatest importance, especially when the box is used in connection with the improved apparatus embraced in and covered by reissue No. 5,351, April 8, 1873, of my patent issued September 24, 1872, No. 131,550, and my improvements thereon, patented May 6, 1873, as when thus used the means in all its stages of a continued and uninterrupted process, from the instant the crude material or resin is placed in the liquidizing-tub until the turpentine and residuum are barreled for market, are provided.

The nature of my invention consists in surrounding the vessel with a jacket so arranged, in connection with the outer surface of the wall thereof, as to provide a chamber which at its upper section has an inlet-pipe and at its lower section a discharge-pipe. This chamber is designed for either steam or water, according to the nature of the liquid in connection with the barreling of which the vessel is used. My invention also consists in surrounding the entire lower section of the vessel with a series of cocks or faucets, the tubes of which lead into the interior or liquid-chamber. These cocks or faucets are at such distance apart as to permit of a barrel being placed under each faucet, and all simultaneously filled. The box is secured on its standards or supports at such an angle of inclination that the faucets at the end of the vessel will thoroughly drain the box of all the liquid that may remain; and the angle of inclination at which the box is placed is also important in permitting the chamber that surrounds the vessel being more readily cleaned and freed from sediment and other impurities.

The construction and operation of my invention are as follows:

A is the box or vessel, and may be of any desired form and capacity, and constructed of any suitable material. The box shown in the drawing is rectangular, having a concave bottom. The wall A' of this box is surrounded by an outer casing or jacket, B', and which is relatively so arranged in connection with the wall A' as to form a closed chamber, B, which surrounds the sides, ends, and bottom of the box. C is a nozzle, and to which is attached any suitable supply-pipe. This nozzle is provided with a cock or valve, $c$, and by means of which the supply to fill the chamber B can be regulated at pleasure. C' is a nozzle, and to which is attached a cock or valve, $c'$, and which permits of the contents of the chamber B being drawn off at pleasure. Along the sides and front of the vessel A, and at its lower section, and leading into the interior or liquid chamber thereof, is a series of openings, $d\,d$, and each of which is provided with a faucet, D, and of the class now used in connection with the retailing of molasses, oils, &c. These openings $d\,d$ are to be relatively so arranged that the space left between the faucets D D shall be little greater than the diameter of the barrels they are designed to supply, and which permits of the barrels being arranged around the box, one under each faucet, and all simultaneously filled. This vessel A, being thus constructed and arranged, is secured on any suitable supports, E E′, one at each end. I propose to make the support E at the head of the box slightly higher than the other, E′, which is at the foot, so that the vessel shall rest at such an angle of inclination that the liquid shall have a tendency to flow toward the front; and, consequently, when the liquid is low, the faucets at this section of the box will still discharge when those at the head have ceased to operate, and which secures the great advantage of a perfect draining of the box by providing it as a means of drawing off all the liquid contained therein. As has been said, a box or vessel thus constructed and arranged is adapted for all such liquids as resin, resin-oil, and other oils, molasses, sirup, &c., and, in connection with the chamber B, provides a most convenient and reliable means of barreling the same.

To illustrate the operation of my improved box, and especially the advantages of the chamber B, and of the employment and arrangement of the series of faucets D D, I will explain its use in connection with the barreling of liquid resin and molasses, and how in connection with one the chamber B can be made to act as a heating agent, while in connection with the other it acts as a cooling agent; in one instance preserving the desired mean temperature, and in the other cooling the liquid as rapidly as possible, and which action in connection with these respective liquids is of the utmost importance, and consequently of the greatest advantage. When used to receive the resin or residuum from the still for the purpose of barreling, the vessel is so placed in connection with the still that the residuum or liquid resin will run directly into its interior chamber. The spigot or valve $c$ is now opened, and through the nozzle C the chamber B is filled with steam supplied from any suitable boiler. The resin is now drawn from the still, but not in condition to be immediately barreled, as it would run through the joints between the staves; consequently it is desirable that it should cool and stiffen a little, but at the same time not become rigid, so that it can be drawn off and barreled before positive crystallization begins. The mean temperature which permits of this being successfully accomplished the steam-chamber B provides. Barrels are placed around the box, one under each faucet D, and so soon as the liquid resin is in condition to be safely barreled the gates of the faucets are lifted and the barrels simultaneously filled, the faucets at the end insuring the entire emptying of the vessel. So soon as the liquid resin is drawn off the box is in condition instantly to be resupplied from the still. The steam, as rapidly as it condenses, is drawn off by the cock $c'$ and nozzle C′, and the chamber B is recharged by opening the cock $c$, and through the nozzle C. In regard to molasses, the simultaneous action of the faucets in filling the barrels is precisely the same, and the box is placed in connection with the kettle or boiler, so as to be filled, precisely as when used in connection with a still; but it being desirous that the boiling liquid should cool as rapidly as possible, the chamber B is filled with water and the cocks $c$ and $c'$ open, one constantly supplying fresh water, while the other is discharging the heated water, and which has become so heated by its passage through the chamber B, and the heat emitted from the wall A′ of the vessel.

What I claim as new, and desire to secure by Letters Patent of the United States, is—

1. The resin, oil, or molasses box A, having a steam-chamber, B, nozzles C C′, and cocks $c\,c'$, the whole being constructed, combined, and arranged to operate substantially as described, as and for the purpose specified.

2. The box A, having a steam-chamber, B, and the series of faucets D D, the whole being constructed, combined, and arranged so as to operate substantially as described.

In testimony whereof I have signed my name to this specification in the presence of two subscribing witnesses.

ARCHIBALD K. LEE.

Witnesses:
EDWIN JAMES,
JOS. T. K. PLANT.